United States Patent Office 3,408,233

Patented Oct. 29, 1968

1

3,408,233

STORAGE BATTERIES AND ELECTROLYTE THEREFOR

Konrad Parker, Park Ridge, and Jerry L. Brosilow, Chicago, Ill., assignors to International Battery, Inc., Schiller Park, Ill., a corporation of Illinois No Drawing. Filed Oct. 24, 1966, Ser. No. 588,773
6 Claims. (Cl. 136—153)

This invention is directed to improvements in storage batteries. In particular, the invention is concerned with batteries of the type using sulfuric acid as the liquid electrolyte. Such batteries, referred to as "lead-acid" batteries, are used to start cars, trucks, etc., and are used to supply other electrical power in such constructions.

It has always been considered desirable to provide batteries which can be initially manufactured to completion, but which can be shipped, stored and otherwise held for indefinite periods before use without damaging the batteries. This has been accomplished to a certain extent; however, various problems are known to exist.

It is a general object of this invention to provide a storage battery which overcomes disadvantages which characterize presently produced batteries.

It is a more specific object of this invention to provide a dry acid electrolyte, which can be stored and shipped inside the cells of a dry-charged storage battery without danger of spillage or plate discharge.

It is a further object of this invention to provide a battery which is adapted to be activated by the simple addition of the water necessary to furnish the required electrolyte.

These and other objects of the invention will appear hereinafter and it will be understood that the specific example set forth are intended for purposes of illustration and not by way of limitation.

So-called dry charged batteries have previously been produced. These batteries consist of alternating negatively charged lead and positively charged lead oxide plates spaced by separators and assembled into elements for each cell or compartment of the battery. The negative lead plates must be completely dry to maintain the charge. Some dry charged batteries are tightly sealed, preferably under vacuum, to prevent moisture absorption and potential lead oxidation. This has necessitated expensive vacuum sealing of dry charged batteries, and other methods, chemical and physical, of limiting the oxidation of the negative plates have also been proven to be inconvenient.

Before installation in a vehicle, the dry charged battery must be filled with so-called battery acid or electrolyte consisting of sulfuric acid of desired specific gravity, generally 1.26. The handling of sulfuric acid by untrained workers in service stations and garages is quite dangerous, since the acid is very corrosive and causes severe burns on contact with the skin and damage to clothing.

These previously produced dry charged batteries require a booster charge after the electrolyte is added to insure that the battery is brought to full electrical capacity. This increases the time and cost of dry charged battery installation, and limits the installation to trained personnel and expensive equipment.

So-called "wet charged" batteries have also been produced on a large scale. These batteries are filled with electrolyte during manufacture and are more expensive to ship because of the considerable weight of the battery acid. In addition, these batteries require special packing and handling during transfer from the plant to the dealer or station to avoid damage to materials or harm to persons from the acid due to spillage or leakage.

The improvements in storage batteries contemplated

2 by this invention may be directed to a variety of battery constructions of standard manufacture. The invention provides for loading of the cells of these batteries with a material comprising a combination of absorbent silica and concentrated sulfuric acid. The combination is provided in a dry form whereby it can be readily handled for loading of the battery cells. The instant invention is concerned with batteries characterized by the dry, acid bearing material as well as the material as such.

Batteries manufactured in accordance with the teachings of this invention provide considerable savings in shipping, packing and handling. The merchandising and installation of batteries is also simplified so that they can be sold in retail stores and installed easily by the automobile owner in his car. He has only to add the proper amount of water to activate the battery for immediate use.

The "dry" electrolyte of the present invention is based on an inert carrier, which absorbs several times its own weight of concentrated sulfuric acid. The carrier employed is a highly absorbent, small particle size silica. Thus, by mixing one part of silica with three to six parts by weight of concentrated sulfuric acid, a dry, free flowing powder is formed. This "dry" electrolyte can be poured into a lead storage battery during or after manufacture. The "dry acid" can also be added to a dry charged battery through the vent openings in the top of the battery.

The amount of dry electrolyte added to the battery will, of course, depend on the size and number of cells, as well as on the final acid concentration desired. There is adequate void space to accommodate the dry electrolyte in battery cases. Sufficient acid carrying powder is added to each cell to provide the needed amount of concentrated sulfuric acid for proper operation of the battery. With addition of the required amount of water to each cell, the absorbed acid is released from the silica surface. As the concentrated sulfuric acid mixes with the water, sufficient heat of solution is generated to activate the battery even in very cold weather. A volume of water approximately four times greater than the volume of concentrated acid is usually added to a standard battery to provide an electrolyte of proper gravity, usually between 1.2 and 1.3 at 80° F.

The arrangement of this invention distinguishes in certain critical respects from prior systems wherein gels were formed by adding sulfuric acid to salts such as aluminum sulfate. None of these prior systems have proven satisfactory, their main drawback being a gradual discharge due to their conductive nature, which allows a small amount of current to flow between the plates. They also introduce undesirable metallic contaminants into the electrolyte, which reduces battery life and efficiency. Furthermore, previously suggested carriers were not completely inert, and over long storage periods reacted with the sulfuric acid to produce undesirable by-products such as sulfate salts which interfere with battery performance.

The acid absorbent of the present invention is pure silica which is completely chemically inert, insoluble and unreactive when employed in the system of this invention. Even after long contact with concentrated sulfuric acid, it remains unchanged and in its original pure state without salt formation or metal contamination.

The silica employed must be chosen so as to provide a surface area sufficiently large to absorb three to six times its weight of sulfuric acid. It should also be as pure as possible, for example, its composition should be 98 percent plus $SiO_2$, on a dry basis, in order to virtually eliminate undesirable contamination.

Many types of natural and synthetic silicas are commercially available; however, two synthetic types meet all the necessary requirements and are considered particularly suitable. One type is a silica aerogel, the other is a micro fine precipitated silica. Both of these have very large surface areas of over 200 square meters per gram. The aerogel is quite porous with over 90 percent air space while the precipitated silica consists of agglomerates of millimicron sized particles of large absorptive capacity. Both are quite pure as manufactured and contain less than one percent metallic impurities. They are capable of converting up to six times their weight of sulfuric acid into a dry, free flowing powder. Also, they mix quite readily with the acid with a minimum of agitation. On addition of water, the acid is released at once and the inert silica particles form a gelatinous precipitate, which is completely nondetrimental to battery performance.

In the practice of the invention, it is preferred to add the sulfuric acid slowly to the silica, while gently mixing in a suitable blender. After all the acid has been added, mixing is continued for a short time to assure uniform dispersion.

The use of silica in the manner described provides additional advantages from the standpoint of proper battery operation. Thus, the silica is hygroscopic and preferentially absorbs moisture from the air, thereby protecting the lead plates from oxidation. Accordingly, the arrangement of this invention actually operates to provide improved conditions for battery operation in contrast to prior techniques wherein the materials employed were detrimental in certain respects.

Silica aerogels of a suitable type are manufactured under the trademark "Santocel" by the Monsanto Chemical Company and as "Syloids" by the W. R. Grace Co. A micro fine precipitated silica is produced by the Philadelphia Quartz Company under the name "Quso." High oil absorption characteristics are sought in selecting particular grades of silica. The final selection also depends on the ability to retain free flowing characteristics after absorption of a satisfactory amount of electrolyte. It will be understood that other types of pure absorbent silica of small particle size and large surface area can be used as the inert absorbent provided they exhibit the general characteristics of the type specifically mentioned.

In a specific example of the present invention, one pound of silica aerogel was mixed with four pounds of concentrated sulfuric acid of 1.84 specific gravity in a Patterson-Kelley blender. One pound of the dry, free flowing acid powder product was loaded into each one of the cells of a six-cell dry charged 12-volt battery of approximately 1.25-gallon electrolyte capacity. The battery was stored for several months under ambient conditions before it was activated by the slow addition of 0.125 gallon of demineralized water to each cell. Sufficient heat was generated to raise the temperature of the battery to 100° F. The battery was tested with a voltage meter, which showed the specified charge of two volts for each cell. The acid concentration was then determined with a hydrometer. Each cell had a specific gravity of 1.25 after temperature correction. The battery was subjected to a load test and delivered full power after 60 seconds application. The battery was then installed in a car approximately 12 months ago and is still performing satisfactorily as of the date of this application with normal usage including zero temperature.

The experiment above was repeated using a micro fine precipitated silica with essentially the same results.

In use, it is immaterial where the dry electrolyte is placed in the battery cells; however, the top of the plates is the preferred location to give the quickest and most uniform acid release on addition of water, but it is not intended to restrict it to that location. The silica will gradually sink to the sediment space in the bottom of the battery, where it remains innocuous, and does not interfere with battery performance.

The dry electrolyte powder can also be pressed or formed into tablets, rods or other shapes. The proper number of forms can then be placed into each cell of a dry charged battery to provide the required weight of acid. This method of loading eliminates the need for weighing the electrolyte into each cell. It thus simplifies and speeds up battery manufacture.

It will be understood that various changes and modifications may be made with respect to the above described system which provides the characteristics of this invention without departing from the spirit thereof particularly as defined in the following claims.

That which is claimed is:

1. In a lead-acid storage battery comprising cells to be loaded with electrolyte, the improvement comprising an electrolyte forming material disposed in said cells, said material comprising a dry mixture consisting essentially of the combination of finely divided, highly absorbent silica and concentrated sulfuric acid, said battery being adapted to be activated by the addition of water to said cells whereby said acid is released from said combination to form an electrolyte solution with said water.

2. A battery in accordance with claim 1 wherein said mixture comprises one part of silica and from three to six parts concentrated sulfuric acid.

3. A battery in accordance with claim 2 wherein said silica is selected from the group consisting of silica aerogel, micro fine precipitated silica, and combinations thereof.

4. A dry electrolyte forming material comprising a mixture consisting essentially of the combination of silica and concentrated sulfuric acid.

5. A material in accordance with claim 4 wherein said mixture comprises one part of silica and from three to six parts concentrated sulfuric acid.

6. A material in accordance with claim 5 wherein said silica is selected from the group consisting of silica aerogel, micro fine precipitated silica, and combinations thereof.

References Cited

UNITED STATES PATENTS

| | | | |
|---|---|---|---|
| 3,067,275 | 12/1962 | Solomon | 136—153 |
| 3,202,611 | 8/1965 | Canty et al. | 252—62.2 |
| 3,304,202 | 2/1967 | Sam | 136—90 |

WINSTON A. DOUGLAS, *Primary Examiner.*

D. L. WALTON, *Assistant Examiner.*